(12) United States Patent
Tenhunen et al.

(10) Patent No.: US 7,051,082 B2
(45) Date of Patent: May 23, 2006

(54) TRANSMISSION OF SERVICE DATA TO SERVICES CONTROLLING THE PROCESSING OF A COMMUNICATION CONNECTION IN AN INTELLIGENT NETWORK-LIKE MANNER

(75) Inventors: Jouko Tenhunen, Helsinki (FI); Eva-Maria Leppänen, Tampere (FI); Erkki Ojala, Veikkola (FI); Heikki Tuunanen, Espoo (FI); Markus Isomäki, Espoo (FI); Balazs Bertenyi, Budapest (HU); Harri O. Koskinen, Helsinki (FI); Haluk Tekbulut, Helsinki (FI); Jari Syrjälä, Helsinki (FI)

(73) Assignee: Nokia Corporation, Espoo (FI)

( * ) Notice: Subject to any disclaimer, the term of this patent is extended or adjusted under 35 U.S.C. 154(b) by 39 days.

(21) Appl. No.: 10/431,578

(22) Filed: May 8, 2003

(65) Prior Publication Data

US 2004/0068533 A1    Apr. 8, 2004

Related U.S. Application Data

(63) Continuation of application No. PCT/FI01/00371, filed on Apr. 12, 2001.

(30) Foreign Application Priority Data

Nov. 8, 2000   (FI)  .................................. 20002449

(51) Int. Cl.
    *G06F 15/16* (2006.01)
(52) U.S. Cl. ..................................... 709/217
(58) Field of Classification Search ................ 709/217, 709/212, 223
    See application file for complete search history.

(56) References Cited

U.S. PATENT DOCUMENTS 4,443,875 A * 4/1984 Blausten .................... 370/410

(Continued)

FOREIGN PATENT DOCUMENTS

FI            98971         9/1997

(Continued)

OTHER PUBLICATIONS

"Generic Support for Distributed Applications", Bacon et al, Computer, pp. 68-76, Mar. 2000, vol. 33, Issue 3.

*Primary Examiner*—David Y. Eng
(74) *Attorney, Agent, or Firm*—Squire, Sanders & Dempsey L.L.P.

(57) ABSTRACT

A communications system and method for providing services to a subscriber of the system is provided. The system includes a system element controlling call processing, service data for a subscriber of the system, and an element for storing subscriber data. The system is configured to associate an indicator with a service data structure of the service data of a subscriber. The element for storing subscriber data is configured to store the service data structure of the service data of the subscriber associated with the indicator. The system is configured to transmit from the element for storing subscriber data service data of a subscriber comprising the service data structure associated with the indicator to the system element controlling call processing service.

19 Claims, 3 Drawing Sheets

U.S. PATENT DOCUMENTS

| | | | |
|---|---|---|---|
| 5,229,992 A * | 7/1993 | Jurkevich et al. | 370/468 |
| 5,282,202 A * | 1/1994 | Bernstein et al. | 370/468 |
| 5,835,583 A * | 11/1998 | Hetz et al. | 379/221.02 |
| 5,966,386 A * | 10/1999 | Maegawa | 370/486 |
| 6,185,289 B1 * | 2/2001 | Hetz et al. | 379/221.08 |
| 6,480,599 B1 * | 11/2002 | Ainslie et al. | 379/265.02 |

FOREIGN PATENT DOCUMENTS

| | | |
|---|---|---|
| WO | WO 99/62273 | 12/1999 |
| WO | WO 00/24182 | 4/2000 |
| WO | WO 00/45610 | 8/2000 |
| WO | WO 00/59239 | 10/2000 |

* cited by examiner

TRANSMISSION OF SERVICE DATA TO SERVICES CONTROLLING THE PROCESSING OF A COMMUNICATION CONNECTION IN AN INTELLIGENT NETWORK-LIKE MANNER

This application is a Continuation of International Application PCT/FI01/00371 filed on Apr. 12, 2001, which designated the U.S. and was published under PCT Article 21(2) in English.

BACKGROUND OF THE INVENTION

1. Field of the Invention

The invention relates to transmitting service data to services controlling the processing of a communications connection in an intelligent network-like manner, and particularly to transmitting service data for non-standard services.

2. Description of the Related Art

Telecommunications network facilities can be divided into three different call processing levels: service level, call control level and switching level. The switching level serves to provide the physical connections (i.e. "media"). The call control level is responsible for routing a call to a correct destination and it controls the switching level. The service level serves to produce the subscriber's supplementary services and possibly also part of the basic service and controls the call control level. In the existing telecommunication networks, a typical facility comprising a supplementary service is conditional call forwarding in which the call situation must be analyzed and the call routed on in accordance with the stored call forwarding service profile.

An intelligent network IN is a network architecture to be attached to a basic network (a fixed or a mobile network, for example) enabling a feature to be divided into a service level and into an entity comprising a switching level and a call control level. The network node providing the intelligent network access is usually the network node which is responsible for connection setup, for example a basic network switching centre comprising an intelligent network service switching function. To provide an intelligent network service, the switching function contacts the intelligent network service control function when it detects a predetermined event.

Conventionally, control in an intelligent network is thus based on services conforming to a standard and on a mechanism and an interface conforming to the same standard built into the node that comprises the switching function. The number of various intelligent networks standards is growing, and another current development trend is the increase of customized services. For example, the pan-European GSM (Global System for Mobile communications) comprises a large number of standardized services, but considerably fewer standardized services are being planned for the so-called third generation mobile communications systems. This allows operators and service providers to also compete on the basis of the service content. New service architectures employing an intelligent network-like control, such as OSA (Open Service Architecture), are also based on openness. It seems at the moment that the number of both standardized intelligent network-like protocols and proprietor-specific intelligent network-like protocols is on the increase.

A problem with the prior art solutions is that the node comprising the switching function must include a mechanism for each different intelligent network-like protocol, or service type, for example to ensure that the system will be prepared to activate a service in connection with call setup and that the service is activated if an activation event is detected. In addition to the mechanism, new interfaces need to be defined as well. This is complicated and makes it difficult and laborious to add new service features.

SUMMARY OF THE INVENTION

It is therefore an object of the invention to provide a method and an equipment implementing the method to allow the above problems to be solved. The objects of the method are achieved with a method and a network node and a communications system characterized by what is stated in the independent claims. The preferred embodiments of the invention are disclosed in the dependent claims.

The invention is based on adding a new function to the node controlling call setup such that it can transmit the service data structure of the service to the system entity which provides the corresponding service. The process is found by using an indicator associated with the service data structure. New capabilities and/or services are thus made transparent to the service control. An advantage of the invention is that it simplifies and facilitates the provisioning of various services irrespective of the protocol used by the services because interfaces do not need to be defined any more; instead, internal processes can be used for offering a similar interface to all services.

According to one preferred embodiment of the invention the service data structure of the service is transmitted to the process responsible for arming the service by using an indicator associated with the service data structure and indicating preferably the service type. The process determines the arming data on the basis of the service data structure and forwards the arming data to an event checking function arming the events according to the arming data.

According to another preferred embodiment of the invention an indicator indicating an address of the system entity providing the service is attached to the service data structure whereby the transmission of the service data structure is based on the address indicated by the indicator.

BRIEF DESCRIPTION OF THE DRAWINGS

In the following the invention will be described in greater detail in connection with preferred embodiments and with reference to the accompanying drawings, in which.

DETAILED DESCRIPTION OF THE PREFERRED EMBODIMENT(S)

Figure 1:
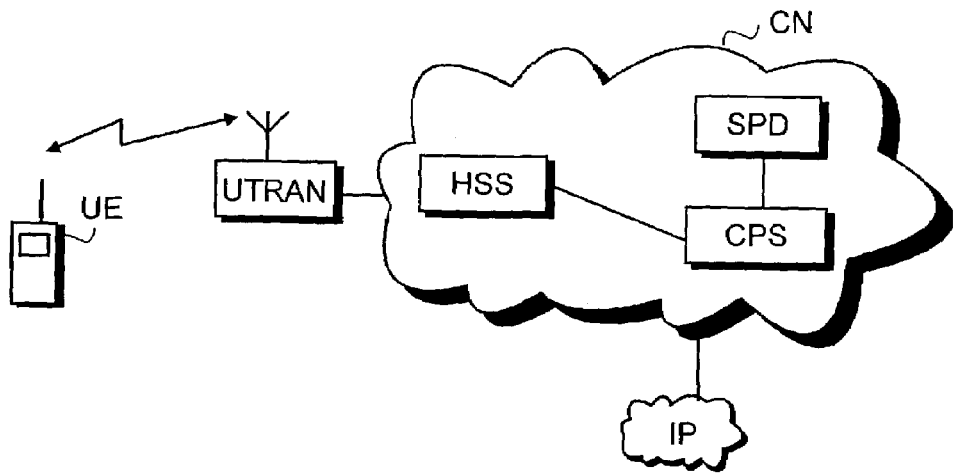
FIG. 1 is a schematic block diagram illustrating a 3GPP All IP system.

The present invention can be applied in any communications system in which connection setup can be controlled in an intelligent network-like manner. These systems include so-called third generation mobile communications systems, such as the Universal Mobile Telecommunications System (UMTS), and so-called second generation mobile communications systems, such as the pan-European GSM (Global System for Mobile Communications) and corresponding mobile communications systems, such as the DCS 1800 (Digital Cellular System for 1800 MHz) and PCS (Personal Communication System), as well as systems based on the ones mentioned above, such as GSM 2+ systems, and fixed systems, such as the PSTN (Public Switched Telephone Network).

A service providing an intelligent network-like control refers both to services offered by a conventional intelligent network and to services employing intelligent network control principles. Intelligent network control principles in turn refer to a solution where the event checking function handling a call contacts a service control function which may provide the event checking function with instructions affecting the handling of the call. The contact may be a notification or a request. When the contact is a request, the event checking function either interrupts the call processing and waits for an instruction(s) or continues call processing and receives the instruction(s) later. The event checking function contacts the service control function on the basis of the armed event data in the event checking function. Armed event data can be added and/or deleted at the request of an external service during the call setup process, or even before the call setup process is started. The call can be depicted as a state model visible to the control function, the state model being formed of phases and detection points associated with them. Detection points refer to armed events, i.e. to those call stages and interaction points, if any, where the service control function may influence the call and/or receive information relating to the call. An entity to be controlled may also operate for example on external impulses alone which generate the triggers and/or other armed events, in which case a state model is not necessarily needed. A trigger is an armed event which triggers a service when certain conditions are met, i.e. it activates the service. Hence the arming of the trigger means preparing for the activation of a service. The controls and operations may also be methods directed to call objects and event notifications associated with them. Examples of protocols employing intelligent network-like call control include Parlay API (Application Protocol Interface) and OSA (Open System Architecture), and naturally different intelligent network protocols, such as WIN (Wireless Intelligent Network) and CAMEL (Customised Applications for Mobile Network Enhanced Logic).

Here the term 'call' refers not only to a conventional call, but also to other, possibly virtual, connection states where user data, such as data sessions or packet data, are transferred. Examples of such include packet radio sessions (such as GPRS sessions), VoIP sessions (Voice over IP) and multimedia sessions according to H.323. The user data may comprise various components, such as voice, video and data. The term 'call' also includes the signalling needed to transfer the user data flow and call-like services, which may be unidirectional services, those addressed to a group (or groups), or general broadcasts within a specific area, for example.

In the following, the invention will be described using the 3GPP AII-IP system, i.e. an UMTS system based on the IP (Internet Protocol) technology defined in the 3GPP ($3^{rd}$ generation partnership project) as an example, without restricting the invention thereto. The specifications for communications systems, particularly those for third generation mobile communications systems, and for network architectures, particularly those for the intelligent network-like architectures, are advancing rapidly. Due to this, additional changes may be required in the invention. All words and expressions used should therefore be interpreted broadly to illustrate and not to restrict the invention.

FIG. 1 is a schematic view of a network architecture of the 3GPP AII-IP system, showing only the elements of a telecommunications system that are essential for understanding the invention. The network nodes shown in FIG. 1 are logical units, and their implementation may differ from the one described here. In addition, a person skilled in the art will find it apparent that the system can also include other functions and structures which do not need to be described in greater detail in this context.

In the 3GPP AII-IP system 1, access layer will be kept separate from telephony layer, and they may both have separate operators. (The division is not shown in FIG. 1). IP telephony is in practice transparent to the access layer network nodes, and the nodes do not participate in the routing of IP telephony. However, both layers have signalling connections to various service platforms, for example to the intelligent network service control point and IP telephony application server (service platforms are not shown in FIG. 1). IP telephony is a general term covering services from standard VoIP (Voice over IP) telephony to multimedia applications employing IP data, voice and video.

In the example shown in FIG. 1, the system comprises a core network CN and a terrestrial radio access network UTRAN. The UTRAN is formed of a plurality of radio network subsystems (not shown in FIG. 1) connected to the core network CN. The core network may be connected to external networks, such as IP networks IP. In the example of FIG. 1, the core network comprises a Home Subscriber Server HSS, Call Processing Server CPS and Serving Profile Database SPD.

The Home Subscriber Server HSS corresponds logically to the home location register of the GSM system, subscriber data for each subscriber in the home network being stored therein, either permanently or semi-permanently, such that the subscriber data are combined with the subscriber identifier, which in the GSM system, for example, is an IMSI. The subscriber data comprise subscriber profile data, which in turn comprise for example service data related to the services the subscriber has subscribed to. The service data is usually represented as a service data structure.

The call processing server CPS is a switching centre which logically corresponds to a mobile services switching centre in the GSM. The CPS controls call setup and takes care of routing, and it comprises for example a function corresponding to the intelligent network service switching function, thus providing control for end-to-end IP telephony services. The CPS is the network node in which the user terminals in IP telephony are registered and through which signalling is transferred to the actual IP network IP, for example. The switching centre CPS of the invention will be described in greater detail in connection with FIG. 2 and the operation of the switching centre in connection with FIGS. 3 and 4.

The serving profile database SPD logically corresponds to the visitor location register in the GSM, subscriber data being loaded (copied) therein from the HSS when a user equipment UE registers into the CPS served by the SPD. The CPS and the SPD can be integrated into one and the same network node.

The user equipment UE comprises the actual user terminal and a detachable identifier card USIM, also known as a subscriber identity module, attached to the terminal. In this context, the user equipment UE usually refers to the entity formed by the actual user terminal and the subscriber identity module. The actual user terminal may be any device, or a combination of several devices, that is capable of communicating in a communications system. The subscriber identity module USIM is a smart card that may contain subscriber service data. The user equipment may also convey service data entered by the user to the network. In this application, no distinction is made between the user and the subscriber, but it is assumed that the user is also the subscriber.

The system implementing the functionality of the present invention and the network nodes of the system comprise not only prior art means, but also means for implementing the functions described in greater detail in connection with FIGS. 2, 3, 4 and 5. More specifically, they comprise means for recognizing a service type to be an intelligent network-like service and for acting accordingly. The present network nodes comprise processors and memory that can be utilized in the functions of to the invention. All changes needed for implementing the invention can be accomplished as added or updated software routines, using application specific integrated circuits (ASIC) and/or programmable circuits, such as EPLD, FPGA.

Figure 2:
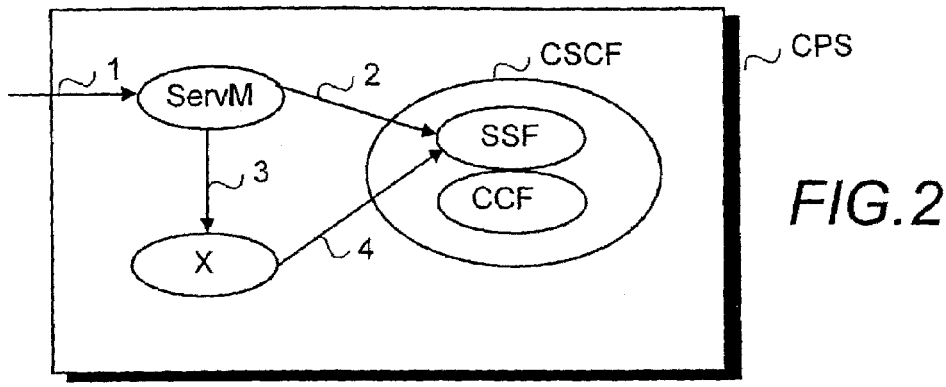
FIG. 2 is a block diagram illustrating a switching centre of a first preferred embodiment of the invention.

FIG. 2 shows a block diagram of entities included in the switching centre of a first preferred embodiment of the invention. The arrows shown in the Figure depict data transfer. The entities comprise a service master function ServM, an internal process X and a Call State Control Function CSCF. For the sake of clarity, FIG. 2 shows only one process X, although one switching centre may comprise a plural number of processes. The entities in FIG. 2 correspond to the entities in the CPS according to the first preferred embodiment of the invention. The entities according to the invention may also be added into the switching centres of other systems, for example into a GSM mobile services switching centre. The Call State Control Function entity, or a corresponding entity, can also be located in some other network node than the two other entities.

The call state control function CSCF is the function into which the user actually registers and which is responsible for call processing. In other words, when call processing is discussed, the CSCF is the function which is implemented by the CPS. According to the first preferred embodiment of the invention the CSCF comprises a service switching function SSF and a call control function CCF which are used for implementing a call control state model or state models. The state models, together with internal processes and other network nodes, such as the call control point and the IP telephony application servers, are used for controlling call setup. The SSF manages detection points, i.e. triggers and other armed events on the basis of data related to a service/ services received from the service master function (data 2) and the various processes (data 4). The SSF of the first preferred embodiment of the invention also comprises Feature Interaction Management, which for example sets the order in which the services of one and the same detection point are to be invoked. The call control function CCF manages control level signalling and provides some capabilities allowing user-level resources to be accessed. Thus, the SSF and the CCF represent here an event checking function which arms an event(s) and, when encountering an event checks, if the event is armed. The event checking function can also check if an event is encountered at all.

The internal process X comprises an activation mechanism for an X type service. After having received service data 3, the internal process for example finds out the triggers and other events that have to be armed for the service and transmits them to the SSF in data 4. The internal process may also prepare the service already before the service is actually triggered. The service data comprises all the data that is needed in connection with the activation of the service. The service data may also comprise data that is not needed when determining events to be armed. At its simplest, the data can be the service indicator alone, for example service number 255. In addition to the service indicator, data 3 may also comprise the detection point and subscriber-specific information relating to the service. The subscriber-specific information may be for example data stored into the subscriber data in the home subscriber server, or data sent by the terminal equipment, for example, which may vary from one call instance to another. The content of data 3 is fully dependent on how the service is implemented. Data 4 comprises at least one event. At its simplest, process X functions as an intermediator, in other words, it sends the service data or part of it to an external application server, for example, and then receives the above-mentioned events to be armed from the server for further transmission to the SSF. The internal process X may also carry out the entire service by itself.

The service master function ServM receives diverse service data 1. The service data 1 may be subscriber-specific service data configured to a home subscriber server, service data received from a user terminal and/or service data, such as signalling messages, received from the network. The service data 1 comprises a service structure for at least one service. The service may be a standard service to the service master function ServM, for example a service conforming to the intelligent network standard CAMEL or WIN, or a proprietor-specific service, such as a supplementary service of the 3GPP AII-IP network. (Similarly, the service data 1 may be proprietor-specific data or data conforming to a standard). Depending on the type of service concerned, the service master function of the first preferred embodiment of the invention either initiates the process indicated by the service type by transmitting the service data structure as such in service data 3 to the process, or by setting the service triggers to the service switching function in data 2. The service master function is thus a kind of service data router. The functionality of the service master function will be described in greater detail in connection with FIG. 3. The service data master function thus provides a functionality through which all the services that require access to the call processing capabilities may arm the necessary detection points. In other words, the service master function provides a uniform service control interface to a plural number of different internal services which in turn provide the call control (usually the call control state model) with the information it needs in the above described manner.

In some other embodiments of the invention the process X transmits data 4, or part of data 4, to the SSFs concerned. The addresses of the SSFs can be determined using predetermined configuration information or, for example, on the basis of call set-up information, such as calling party and called party identifiers, at the time the transaction takes place. The term transaction refers to a call, session or message transmission. Each node participating in the set-up and supervision of transactions relating to the service may comprise an SSF needed for the service. In other words, the nodes comprising an SSF needed for the service are those network nodes via which signalling or media streams for a given call are carried.

Figure 3:
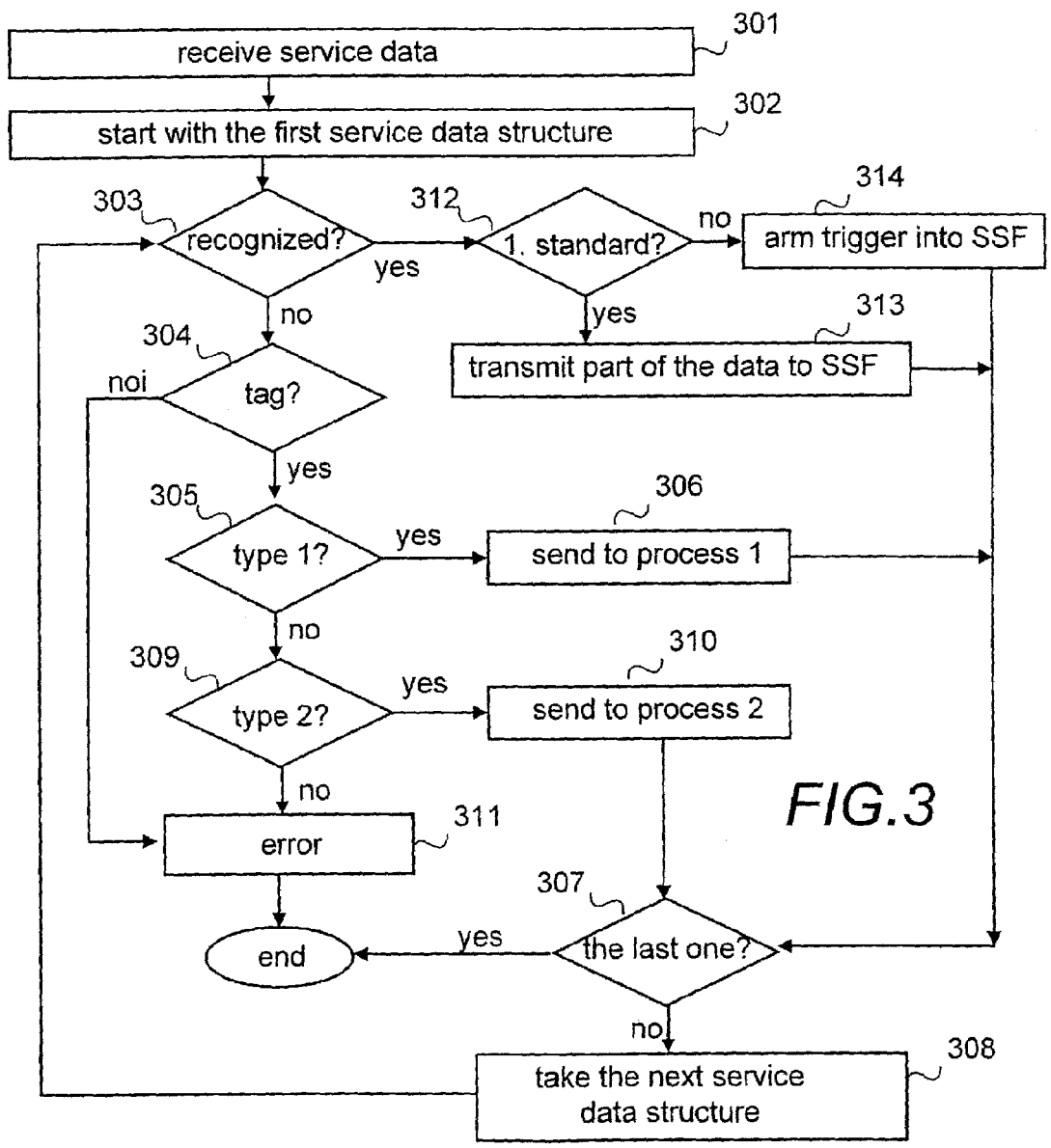
FIG. 3 is a flow diagram illustrating the functionality of a service master function according to the first preferred embodiment of the invention.

FIG. 3 illustrates the functionality of the service master function in the first preferred embodiment of the invention. The example shown in FIG. 3 assumes that two different proprietor-specific service types are used, in addition to two different standard services. A standard service refers to a service which is implemented using a service mechanism defined in a standard, the standard portion of the service being built into the service master function such that the service master function recognizes and understands the contents of the service data structure of the service and is capable of for example distinguishing the different data, such as the trigger, related to the service in accordance with the standard in question. It is to be noted that the service master function ServM may consider a standard service, for example, to be a proprietor-specific service, until the standard portion of the service is built into the service master function ServM. When standard services are concerned, the service master function ServM of the first preferred embodiment of the invention also knows which one of the call control processes in the switching centre is the one that processes the service impulses according to the standard and which portions of the service data structure are to be transmitted to the process in question.

The first preferred embodiment of the invention assumes that the service data structure comprises a tag indicating a service which is not a standard service but a proprietor-specific service. The tag indicates the process that understands the service structure and comprises the activation mechanism related to the service. Instead of the tag, also another indicator associated with the service data structure may be used to indicate whether the service in question is a proprietor-specific service or a standard service and/or to indicate the service type and, thereby, the process that understands the service data structure. The indicator may indicate the process explicitly or implicitly. The indicator may also comprise several different subindicators, the combination of them indicating the process.

With reference to FIG. 3, the service master function receives service data in step 301, for example because a subscriber is making a phone call due to which the switching centre asks the SPD to provide service data associated with the subscriber. In step 302 the service master function starts to go through the service data service by service, starting from the service data structure of the first service. In step 303 the service master function checks whether it recognizes the service data structure. In other words, it checks, whether the service in question is a standard service. If the service master function does not recognize the service data structure, the routine checks in step 304 whether there is a tag associated with the service data structure. If there is, then the routine proceeds to step 305 to check whether the tag indicates that the service data structure relates to a service of type 1. If the tag indicates type 1, in step 306 the service data structure is sent to process 1 for further processing and in step 307 it is checked whether the service data structure concerned was the last one in the service data. If it was not, then the service data structure of the next service is examined in step 308, and the routine moves to step 303 to check whether the service data structure can be recognized.

If it is detected in step 307 that the service data structure was the last one, then the service master function completes its functionality with regard to this call.

If the tag does not indicate that the service is a type 1 service (step 305) the routine proceeds to step 309 to check whether the tag shows that the service data structure relates to a type 2 service. If the tag indicates type 2, then the service data structure is sent in step 310 to process 2 for further processing, and the routine moves to step 307 to check whether the service data structure in question was the last one.

If the service structure tag does not indicate that the service in question is type 1 or type 2 service, an error situation is detected in step 311. An error situation is also detected if the service master function does not recognize the service structure and there is no tag associated with service structure (step 304). In an error situation the routine may act according to one or more of the following alternatives: 1) inform the party requesting the service of the error and wait for instructions; 2) raise an alarm; 3) raise an alarm and write an entry into the log file about the error situation; 4) continue the call setup process or the call; 5) interrupt the call setup process or the call; and/or 6) reject the service.

If the service data structure is recognized (step 303), the routine checks in step 312 whether the service data structure conforms to the first standard. If it does, then predetermined portions of the service data structure are transmitted in step 313 to the switching function which, on the basis of these data, arms the service trigger (triggers). In other words, the data transfer taking place in step 313 sets the trigger (triggers) to the service switching function. The routine then proceeds to step 307 to check whether the service data structure in question was the last one.

If the service data structure in question is not a structure according to the first standard, it is a service data structure of a second standard. The service master function carries out some of the tasks involved in the processing of the initial phase of the service concerned for example by arming the trigger (triggers) to the switching function in step 314. The service master function then moves to step 307 to check whether the service data structure concerned the last one.

Steps 312–314 in FIG. 3 illustrate how the processing of the services (the service data structure) may vary when carried out according to different standards, i.e. the tasks of the service master function may be different in connection with different standards.

As will be apparent on the basis of the above, the service master function does not need to understand or process in any way the contents or logic of proprietor-specific service (i.e. service provided with a tag or other indicator), it only needs to know where the service data structure is to be transferred, i.e. where to find a process which understands the contents or logic of the service data structure. In other words, the service master function must be able to identify the service type, irrespective of where the service data is received from.

In a preferred embodiment of the invention it is first checked whether the service data structure comprises a tag and, if it does not, then the service data structure is interpreted as a standard service, i.e. a service having a service data structure recognizable to the service master function.

In another preferred embodiment of the invention, all the service data structures contain a tag. In this embodiment the tag on the standard service may indicate the type of the standard service in question. Alternatively, it may indicate that the service in question is a standard service.

In yet another preferred embodiment of the invention, the service master function transmits the standard service data structure directly to the switching function which separates the detection points to be armed, for example, from the data structure.

The items in FIG. 3 are not in an absolute chronological order. For example, some of the above described steps may take place simultaneously, or in another order. Some steps may be skipped, such as those related to the standard service in switching centres which do not support any standard services, but in which all services are implemented as proprietor-specific services. Correspondingly, other steps not shown in FIG. 3 may take place between the above mentioned steps.

Figure 4:
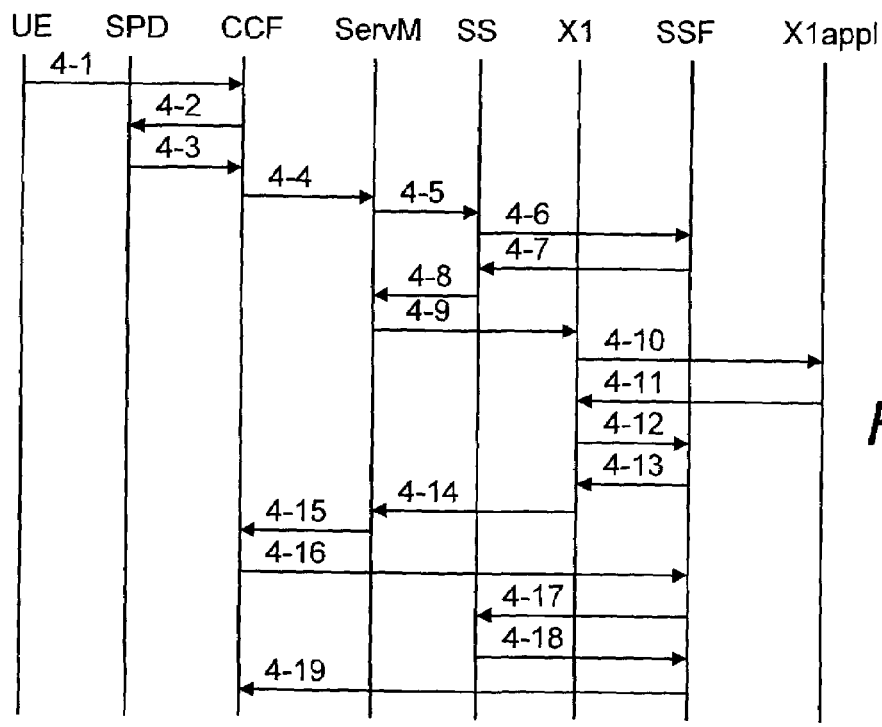
FIG. 4 is an example of data transfer according to the first preferred embodiment of the invention.

FIG. 4 shows data transfer according to the first preferred embodiment of the invention when a call employing IP telephony is made from the user equipment. For the sake of clarity, it is assumed that the user equipment is registered into the CSCF in advance, and therefore the subscriber's user profile (service data) has been retrieved and transmitted to the SPD serving the CSCF. It is further assumed that the CSCF where the user equipment is registered controls the call setup, the call being thus routed to the CSCF. Some of the data transfer shown in FIG. 4 is internal data transfer within the node comprising the switching function, i.e. the switching centre, and some is signalling.

The user terminal UE sends a call setup request in message 4-1 to switching centre controlling the call setup and to the call control function CCF of the CSCF residing in the switching centre. In response to request 4-1, the CCF requests in message 4-2 subscriber data from the profile database SPD serving the CCF and in message 4-3 it receives a user profile. In the example of FIG. 4 the user profile comprises two subscriber service data structures. The CCF activates the service master function ServM by sending the service data portion of the user profile in message 4-4 to the function. The service master function analyses the user profile as shown in connection with FIG. 3.

Since the tag in the first service data structure indicates a supplementary service SS, the ServM sends the service data structure to a process SS in message 4-5. The process SS processes the service data structure and informs the service switching function SSF in message 4-6 about call events and impulses the function is interested in. After having received the message 4-6, the SSF arms the corresponding events and triggers and sends the process SS an acknowledgment message 4-7, after which the process SS acknowledges the arming of the service corresponding to the service data structure in message 4-8.

The second service data structure also contains a tag, but the tag indicates a process X1. The ServM sends a service data structure to process X1 in message 4-9. Process X1 is an intermediator process, in other words, it is an activation mechanism for requesting and transmitting activation data and, depending on the implementation, also for requesting and transmitting call setup instructions related to the service. For this reason, process X1 sends the service data structure it received in message 4-9 forward in message 4-10 to an external application platform X1appl. The external application platform X1appl in turn sends in message 4-11 those call events and impulses to process X that the external application platform is interested in. Process X sends these call events and impulses to the SSF in message 4-12 as events and impulses the process itself is interested in. After having received message 412, the SSF arms the corresponding events and triggers, and sends process X1 acknowledgment message 4-13, after which process X1 acknowledges the activation of the service corresponding to the service data structure in message 4-14. The external application platform may also send in message 4-11 a direct address to which the armed detection points are to be reported. In this case, process X transmits the direct address and the events and impulses in message 4-12 as events and impulses to be reported to the direct address, in which case the service switching function does not use process X1 as the reporting address, but the address given in message 4-12. The use of the external application platform is thus transparent to the service switching function SSF, the service master function ServM and the call control function CCF.

After having received the acknowledgments for both services corresponding to the service data structure, the service master function ServM sends an acknowledgment of the service data activation in message 4-15 to the CCF.

As the call setup proceeds, the CCF detects that an event armed by the SSF is encountered. The CCF interrupts the processing of the call setup and sends the SSF information in message 4-16 about an encountered event n. The SSF checks which of the processes are interested in the event n. In the example of FIG. 4, only process SS is interested in it, so the SSF informs, in message 4-17, only process SS about the event n. Process SS analyses the event n and, in the example of FIG. 4, it detects that the subscriber has activated an outgoing call barring and, therefore, it sends the switching function SSF a message 4-18 instructing it to release the call. The SSF relays the instruction to the CCF in message 4-19, whereby the CCF starts to release the call. In other words, call control functions similarly as in prior art solutions, the only change being that instead of contacting the service control function, the SSF contacts a process. Consequently, the SSF does not need to know whether the service is a standard service or a proprietor-specific service.

The data transfer shown in FIG. 4 would be similar even if the service data structure or corresponding service data were received from the user equipment or the network.

In one embodiment of the invention the service data received by the service master function ServM comprises at least one service data block tagged with a schema identifier identifying the syntax standard to which the block complies. In other words the schema identifier identifies the structuring standard of the block. Examples of such syntax standards include different XML (extensible Mark up Language) schemas, i.e. DTDs (Document Type Definitions). In this embodiment, the service master function ServM knows the mapping between different processes and different syntax standards. By inspecting the schema identifier, the service master function ServM knows which process can handle this type of service data. In other words, the schema identifier identifies the process.

Although the invention is described above assuming that the service master function carries out all the checking with regard to the services, the tasks of the service master function can be divided among a plural number of functions for example by providing also the SPD with a service master function that processes services provisioned to the subscriber, the CPS processing call-specific services. Some of the functionality of the service master function may also be located in the HSS.

Although the invention is described above assuming that the service master function is a separate function, its functionality can also be arranged as a part of an already existing functionality, such as the SPD. The functionality can also be divided among various functions; for example, the SPD may be arranged to send data structures provided with a tag to a process indicated by the tag and those without a tag to the SSF.

Figure 5:
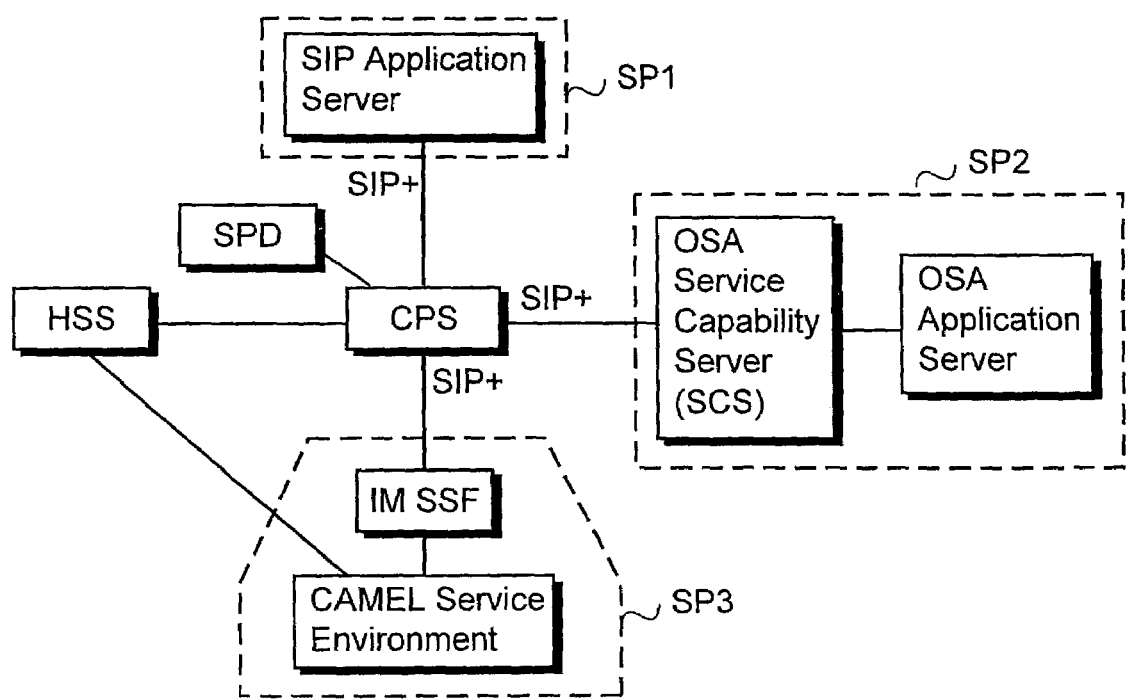
FIG. 5 is a schematic block diagram illustrating a 3GPP service provisioning architecture.

FIG. 5 is a schematic block diagram illustrating a 3GPP service provisioning architecture. 3GPP is about to stanrdardize an interface called SIP+ (Session Initiation Protocol). SIP+ is about to be used between the CPS (comprising Serving CSCF) and any of the service platforms, such as IM SSF (in practice CAMEL SSF) SP3, OSA SCS SP2 or SIP Application Server SP1. In this document, service platform refers generally to a system entity such as a network element or a combination of network elements (such as IM SSF and CSE), which is accessed from the CPS with SIP+ or a similar interface. It should be noted, however, that that the end-point does not have to be external but a similar mechanism can be realised as an internal implementation as well. The CPS does not need to know whether the end-point is stand-alone or controlled through some other service control protocol interface by some adjunct service control point. Because SIP+ is expected to serve all service platforms and they are expected to be very different from their nature, SIP+ should specify different extensions for different purposes. Those extensions would either need to be packed and unpacked in the S-CSCF, depending on the target service platform or if the target is unknown all extensions should always be populated and the targeted service platforms should discard those of which are irrelevant to itself. Extensibility of such fixed protocol may be difficult because it would require updating the S-CSCF and possibly also other service platforms than the one which is affected. The present invention, however, provides a transparent service information delivery method which can be used together with SIP+ or a similar interface. It enables service platform dependent data transport to all service platforms SP1, SP2 and SP3 equally. According to the second preferred embodiment of the invention service platform specific data (service data structure), such as e.g. CSI (Camel Subscription Information) for IM SSF or some serviceIDs for SIP Application Server or other subscription info which could be relevant for a particular service platform SP1, SP2 or SP3, are delivered from e.g. the HSS via temporary storage in the SPD (serving the CPS in question) to the service execution platform at the same time when a session is routed to the platform in question. It should be noted that in the following embodiments of the invention which relate to the transmission of service data to a service platform or similar system entity the CPS may be deviate from the one shown in FIG. 2 and described in connection with the first preferred embodiment of the invention. For example, the service switching function SSF and the service master function ServM according to the first preferred embodiment of the invention are not necessarily needed. Service platform specific data i.e. service data structure can be stored in a "container" which is preferably permanently stored into the HSS and downloaded during subscriber data retrieval to the SPD. That "container" is transparent for the CPS, hence the CPS does not need to know what it contains and to which kind of service platform it is ment to. The container is just passed to that service platform by the CPS (i.e. by a function inside or associated with the CPS and which can be integrated into the CSCF or implemented as a separate function similar to the service master function in the first preferred embodiment of the invention, for example) based on an indicator associated with it. The indicator is preferably an address of the service platform. No triggering mechanism, excluding the address entry on some service platform execution order list, is needed in the CPS. The CPS only needs to know which container needs to be passed to which service platform, using SIP+. The container itself contains triggers for invoking services in the target service platform. This data is received by the service platform per call/session basis, for example. The use of the invention provides the following advantages: the service execution platform does not need to store all subscriber specific data, such as triggers, which is needed for activating the service for a subscriber. Otherwise the subscriber should perhaps be registered to the service platform in order to prepare the service platform for initiating his/her services. Further, the CPS does not need to implement triggering mechanism. It only needs to associate a transparent data container with each service platform destination address and pack the container to SIP+ by the time of initiating a session towards the platform. And finally the CPS does not need to be modified if the service specific data changes, because the data container is treated transparently by the CPS.

According to an embodiment of the invention the transmission of the service data can be implemented as follows: during the subscriber data retrieval from the HSS, a sequential service platform invocation list is received by the CPS. Each address on this list (or these lists, if multiple lists exist) is associated with a set of transparent data i.e. service data structure (information in a "container") for the CPS. Information in the container may be routing address dependent. Routing address dependency makes the information service platform dependent. Nevertheless, for the CPS all containers are equal and each address may hide whichever service platform SP1, SP2 or SP3 behind the address and container combination. The CPS should preferably be able to find out the nature of the session (i.e. whether the session is mobile originated, mobile terminated or a forwarded session). Based on that information the container which needs to be sent to the service platform SP1, SP2 or SP3 could be selected in the S-CSCF, if there are different containers for different types of session establishment (mobile originated/termianted/forwarded). Another option for implementing this is to convey the container data or part of it within registration to the service platform and send an identifier pointing to the data by CPS to the service platform. The container may also be different depending on the mode of the session (registration, session setup etc.) Also the service platform contact list may be different for different modes, i.e. e.g. during a registration there may be less or none service platforms via which the SIP+ signalling needs to be circulated than what there will be during a session setup. Also the service platform address might be different for different types of events. As soon as the service platform receives the container—during a session setup or registration—it examines he data in it and functions accordingly. For example IM SSF may trigger to a CSE, if the triggering criteria (which is also included in the container) is fulfilled.

The indicator associated with the service data structure can alternatively be a logical name, such as an Internet URI/URL, enabling the address of the system entity providing the corresponding service to be obtained. Further, said indicator can be a logical name, which is used in the routing of at least one message to the system entity providing the service.

Although the invention is described above using a subscriber A, i.e. a calling party, as an example, a person skilled in the art will find it apparent how to apply the invention to services of a called subscriber.

It is apparent to a person skilled in the art that as technology advances, the basic idea of the invention can be implemented in various ways. The invention and its embodiments are therefore not restricted to the above described examples but they may vary within the scope of the claims.

The invention claimed is:

1. A method of transmitting service data in a communications system providing services to a subscriber of the system and comprising a call processing controlling system element, service data for at least one subscriber of the system, the service data comprising at least one service data structure, and an element for storing subscriber data, the method comprising:

associating an indicator with at least one service data structure of the service data of at least one subscriber;

storing said at least one service data structure of the service data of at least one subscriber associated with the indicator in the element for storing subscriber data;

transmitting from the element for storing subscriber data service data of a subscriber comprising said at least one service data structure associated with the indicator to the system element controlling call processing service;

receiving in the system element controlling call processing the service data of the subscriber comprising at least one service data structure associated with the indicator; and transmitting the service data structure associated with the indicator to a system entity indicated by the indicator.

2. The method of claim 1, the method comprising:

attaching an indicator indicating the service type of a service data structure to at least one service data structure of service data of at least one subscriber;

maintaining at least a first process, which comprises a first activation mechanism relating to a service of at least a first service type;

maintaining at least a second process, which comprises a second activation mechanism relating to a service of at least a second service type;

receiving in the system element controlling call processing at least one service data structure associated with an indicator indicating the service type of the service data structure; and transmitting the service data structure to the process indicated by the indicator.

3. The method of claim 2, the method comprising:

attaching an indicator indicating the service type of a service data structure to at least one service data structure of service data of at least one subscriber;

maintaining an event checking function for arming at least one event;

maintaining at least a first process, which comprises a first activation mechanism relating to a service of at least a first service type;

maintaining at least a second process, which comprises a second activation mechanism relating to a service of at least a second service type;

receiving in the system element controlling call processing at least one service data structure associated with an indicator indicating the service type of the service data structure;

transmitting the service data structure to the process indicated by the indicator;

determining on the basis of the service data structure at least one event to be armed for the service;

transmitting data about the event to be armed from the process to the event checking function; and arming the event.

4. The method of claim 3, the method further comprising:
encountering the armed event at call setup; and
informing the process which determined the event to be armed that the armed event was encountered.

5. The method of claim 3, the method further comprising:
transmitting also the address of the service control function from the process which determined the event to be armed to the event checking function;
encountering the armed event in the call setup; and
informing the service control function that the event was encountered.

6. The method of claim 3, the method further comprising:
supporting at least one standard service in the network node;

checking, in response to receiving the service data structure, whether the service data structure is recognized in the network node; and if it is recognized, arming at least one event for the standard service; and if it is not recognized, checking whether the service data structure is associated with an indicator and if it does, transmitting the service data structure to the process indicated by the indicator.

7. The method of claim 3, the method further comprising:
supporting at least one standard service in the network node;

checking, in response to receiving the service data structure, whether the service data structure is associated with an indicator; and if it is not, interpreting the service data structure to be that of a standard service and arming at least one event for the standard service.

8. The method of claim 3, the method further comprising:
supporting at least one standard service in the network node;

checking whether the indicator indicates a standard service; and if it does, arming at least one event for the standard service.

9. The method of claim 1, the method comprising:
attaching an indicator indicating an address of a system entity to at least one service data structure of the service data of at least one subscriber;

receiving in the system element controlling call processing service data of a subscriber comprising at least one service data structure associated with an indicator and transmitting the service data structure associated with an indicator to a system entity having the address indicated by the indicator.

10. The method of claim 1, wherein said indicator is an address of said system entity.

11. The method of claim 1, wherein said indicator is a logical name enabling an address of said system entity to be obtained.

12. The method of claim 1, wherein said indicator is a logical name used in the routing of at least one message to said system entity.

13. The method of claim 11, wherein said logical name is an Internet URI/URL.

14. A network node controlling call processing in a communications system providing services to a subscriber of the system and comprising service data for at least one subscriber of the system, the service data comprising at least one service data structure, and an element for storing subscriber data, the network node comprising:

at least a service master function for receiving from the element for storing subscriber data service data which comprises at least one service data structure associated with an indicator and for sending the service data structure to a system entity indicated by the indicator;

an event checking function for arming at least one event;

a first process for receiving and processing a service data structure of a first service type to determine at least one event to be armed for a service and for sending arming data to the event checking function, the arming data indicating at least one event to be armed for the service;

a second process for receiving and processing a service data structure of a second service type to determine at least one event to be armed for a service and for sending the corresponding arming data to the event checking function; and a service master function for receiving service data which comprises at least one service data structure associated with an indicator and for sending the service data structure to the process indicated by the indicator;

wherein the event checking function is configured to arm, in response to the receipt of the arming data, the event indicated in the arming data.

15. The network node of claim 14, wherein the network node is configured to support at least one standard service; and the service master function is configured to recognize the service data structure related to the standard service and to transmit information, in response to the service data structure of the standard service, to the event checking function for arming at least one event related to the service.

16. The network node of claim 15, the network node being configured to receive service data at least from a communications system network node comprising subscriber data.

17. The network node of claim 15, the network node being configured to receive service data at least from a communications system user equipment.

18. The network node of claim 15, the network node being configured to receive service data from a communications system network.

19. A communications system providing services to a subscriber of the system and comprising:

a system element controlling call processing;

service data for at least one subscriber of the system, the service data comprising at least one service data structure; and an element for storing subscriber data, wherein the system is configured to associate an indicator with at least one service data structure of the service data of at least one subscriber;

the element for storing subscriber data is configured to store said at least one service data structure of the service data of at least one subscriber associated with the indicator;

the system is configured to transmit from the element for storing subscriber data service data of a subscriber comprising said at least one service data structure associated with the indicator to the system element controlling call processing service; and the system element comprises means for receiving service data which comprises at least one service data structure associated with the indicator and for sending the service data structure to a system entity indicated by the indicator.

* * * * *